United States Patent
Takeuchi et al.

(10) Patent No.: US 12,087,905 B2
(45) Date of Patent: Sep. 10, 2024

(54) IONIC CONDUCTOR AND ELECTRICITY STORAGE DEVICE

(71) Applicant: NGK SPARK PLUG CO., LTD., Nagoya (JP)

(72) Inventors: Yuki Takeuchi, Nagoya (JP); Manato Uchida, Nagoya (JP); Yuta Iga, Nagoya (JP); Daisuke Shishihara, Nagoya (JP); Hideaki Hikosaka, Nagoya (JP); Hidetoshi Mizutani, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 1018 days.

(21) Appl. No.: 17/042,742

(22) PCT Filed: Apr. 23, 2019

(86) PCT No.: PCT/JP2019/017195
§ 371 (c)(1),
(2) Date: Sep. 28, 2020

(87) PCT Pub. No.: WO2019/212007
PCT Pub. Date: Nov. 7, 2019

(65) Prior Publication Data
US 2021/0104776 A1    Apr. 8, 2021

(30) Foreign Application Priority Data

May 2, 2018 (JP) .................................. 2018-088495

(51) Int. Cl.
*H01M 10/0562*    (2010.01)
*H01M 4/13*    (2010.01)
(Continued)

(52) U.S. Cl.
CPC ......... *H01M 10/0562* (2013.01); *H01M 4/13* (2013.01); *H01M 4/62* (2013.01);
(Continued)

(58) Field of Classification Search
None
See application file for complete search history.

(56) References Cited

U.S. PATENT DOCUMENTS

| | | | |
|---|---|---|---|
| 4,201,839 A | 5/1980 | Johnson et al. | |
| 2015/0171463 A1 | 6/2015 | Liang et al. | |

(Continued)

FOREIGN PATENT DOCUMENTS

| | | |
|---|---|---|
| CN | 107112065 A | 8/2017 |
| EP | 3789346 A1 | 3/2021 |

(Continued)

OTHER PUBLICATIONS

Yoshida et al., Solid State Ionics, 285, 2016, 96-100. (Year: 2016).*

(Continued)

*Primary Examiner* — Eli S Mekhlin
(74) *Attorney, Agent, or Firm* — Leason Ellis LLP; Melvin C. Garner; Mitsuhiro Haraguchi

(57) ABSTRACT

Provided is an ionic conductor with which adhesion between particles can be enhanced simply by pressure-molding a powder without using sulfide ionic conductors and without performing firing or vapor deposition, and which can exhibit a high lithium ionic conductivity. This ionic conductor contains, in addition to an oxide lithium ionic conductor, a complex hydride.

13 Claims, 6 Drawing Sheets

(51) Int. Cl.
  *H01M 4/62* (2006.01)
  *H01M 10/0525* (2010.01)
  *H01M 12/02* (2006.01)

(52) U.S. Cl.
  CPC ....... *H01M 10/0525* (2013.01); *H01M 12/02* (2013.01); *H01M 2300/0071* (2013.01)

(56) References Cited

U.S. PATENT DOCUMENTS

| | | |
|---|---|---|
| 2017/0338512 A1 | 11/2017 | Nogami et al. |
| 2018/0062166 A1 | 3/2018 | Sasaki |
| 2018/0175446 A1 | 6/2018 | Nishizaki et al. |

FOREIGN PATENT DOCUMENTS

| | | |
|---|---|---|
| JP | 2017-004910 A | 1/2017 |
| JP | 2018-032621 A | 3/2018 |
| WO | WO-2017/018217 A1 | 2/2017 |

OTHER PUBLICATIONS

Kim et al., Chem. Mater., 2018, 30, 386-391. (Year: 2018).*
International Search Report mailed Jul. 16, 2019 for the corresponding PCT International Patent Application No. PCT/JP2019/017195.
Extended European Search Report mailed Dec. 22, 2021 for the corresponding European Patent Application No. 19797047.8.
Chinese Office Action mailed Mar. 8, 2022 for the corresponding Chinese Patent Application No. 201980029812.X.
Korean Office Action mailed Mar. 23, 2022 for the corresponding Korean Patent Application No. 10-2020-7029803.

* cited by examiner

FIG. 2

| SAMPLE No. | COMPOSITION OF ION CONDUCTOR (vol%) | LITHIUM ION CONDUCTIVITY (S/cm) |
|---|---|---|
| S1 | 3LiBH$_4$·LiI <br> 100 | $2.8 \times 10^{-5}$ |
| S2 | LLZ-MgSr : 3LiBH$_4$·LiI <br> 20 : 80 | $6.7 \times 10^{-5}$ |
| S3 | LLZ-MgSr : 3LiBH$_4$·LiI <br> 30 : 70 | $1.1 \times 10^{-4}$ |
| S4 | LLZ-MgSr : 3LiBH$_4$·LiI <br> 50 : 50 | $1.2 \times 10^{-4}$ |
| S5 | LLZ-MgSr : 3LiBH$_4$·LiI <br> 75 : 25 | $1.0 \times 10^{-4}$ |
| S6 | LLZ-MgSr : 3LiBH$_4$·LiI <br> 85 : 15 | $1.2 \times 10^{-5}$ |
| S7 | LLZ-MgSr : 3LiBH$_4$·LiI <br> 95 : 5 | $3.6 \times 10^{-6}$ |
| S8 | LLZ-MgSr <br> 100 | $2.0 \times 10^{-8}$ |

FIG. 4

| SAMPLE No. | COMPOSITION OF ION CONDUCTOR (vol%) | LITHIUM ION CONDUCTIVITY (S/cm) |
|---|---|---|
| S11 | $Li_2B_{12}H_{12}$ <br> 100 | $2.1 \times 10^{-5}$ |
| S12 | $LLZ\text{-}MgSr : Li_2B_{12}H_{12}$ <br> 20 : 80 | $4.5 \times 10^{-5}$ |
| S13 | $LLZ\text{-}MgSr : Li_2B_{12}H_{12}$ <br> 30 : 70 | $4.5 \times 10^{-5}$ |
| S14 | $LLZ\text{-}MgSr : Li_2B_{12}H_{12}$ <br> 50 : 50 | $3.7 \times 10^{-5}$ |
| S15 | $LLZ\text{-}MgSr : Li_2B_{12}H_{12}$ <br> 75 : 25 | $3.0 \times 10^{-5}$ |
| S16 | $LLZ\text{-}MgSr : Li_2B_{12}H_{12}$ <br> 85 : 15 | $1.7 \times 10^{-5}$ |
| S17 | $LLZ\text{-}MgSr : Li_2B_{12}H_{12}$ <br> 95 : 5 | $1.6 \times 10^{-6}$ |
| S18 | $LLZ\text{-}MgSr$ <br> 100 | $2.0 \times 10^{-8}$ |

FIG. 6

| SAMPLE No. | COMPOSITION OF ION CONDUCTOR (vol%) | CAPACITY MAINTENANCE RATIO (%) |
|---|---|---|
| S21 | $Li_2B_{12}H_{12}$ <br> 100 | 20 |
| S22 | LLZ-MgSr : $Li_2B_{12}H_{12}$ <br> 20 : 80 | 66 |
| S23 | LLZ-MgSr : $Li_2B_{12}H_{12}$ <br> 25 : 75 | 69 |
| S24 | LLZ-MgSr : $Li_2B_{12}H_{12}$ <br> 30 : 70 | 81 |
| S25 | LLZ-MgSr : $Li_2B_{12}H_{12}$ <br> 40 : 60 | 86 |
| S26 | LLZ-MgSr : $Li_2B_{12}H_{12}$ <br> 50 : 50 | 87 |
| S27 | LLZ-MgSr : $Li_2B_{12}H_{12}$ <br> 75 : 25 | 88 |
| S28 | LLZ-MgSr : $Li_2B_{12}H_{12}$ <br> 85 : 15 | 82 |
| S29 | LLZ-MgSr : $Li_2B_{12}H_{12}$ <br> 95 : 5 | 70 |

# IONIC CONDUCTOR AND ELECTRICITY STORAGE DEVICE

CROSS-REFERENCE TO RELATED PATENT APPLICATIONS

This application is a U.S. National Phase Application under 35 U.S.C. § 371 of International Patent Application No. PCT/JP2019/017195 filed on Apr. 23, 2019 and claims the benefit of priority to Japanese Patent Applications No. 2018-088495 filed on May 2, 2018, all of which are incorporated herein by reference in their entireties. The International Application was published in Japanese on Nov. 7, 2019 as International Publication No. WO/2019/212007 under PCT Article 21(2).

FIELD OF THE INVENTION

The technique disclosed in the present specification relates to an ionic conductor.

BACKGROUND OF THE INVENTION

In recent years, an increasing demand has arisen for high-performance electricity storage devices in association with, for example, the prevalence of electronic apparatuses (e.g., personal computers and cellular phones) and electric-powered automobiles, and the growing use of natural energy such as sunlight or wind power. In particular, expectations are placed on the utilization of a complete-solid lithium ion secondary battery in which all battery elements are formed of a solid (hereinafter the battery may be referred to as a "complete-solid battery"). The complete-solid battery is free from, for example, leakage of an organic electrolytic solution or flashing, and thus is safer than a conventional lithium ion secondary battery containing an organic electrolytic solution prepared by dissolution of a lithium salt in an organic solvent. Since the complete-solid battery can be provided with a simple casing, the battery achieves an increase in energy density per unit mass or unit volume.

Solid electrolyte layers and electrodes of complete-solid batteries are formed of a solid electrolyte such as an oxide-type lithium ion conductor or a sulfide-type lithium ion conductor. The oxide-type lithium ion conductor in powder form is relatively hard. When the powder is press-molded, the molded product (compact) exhibits a low degree of contact between particles and has low lithium ion conductivity. When the powder of the oxide-type lithium ion conductor is subjected to sintering or vapor deposition, lithium ion conductivity can be enhanced. However, as compared to the case in which the powder is press-molded, difficulty is encountered in increasing the battery size, and cumbersome production steps must be conducted.

In contrast, the sulfide-type lithium ion conductor in powder form is relatively soft. When the powder is press-molded, the molded product (compact) exhibits close contact between particles and has high lithium ion conductivity. However, the sulfide-type lithium ion conductor reacts with water in air, to thereby generate hydrogen sulfide gas, which is not preferred from a safety aspect.

There has been known a technique which achieves both high safety and enhanced lithium ion conductivity, the technique employing a lithium ion conductor prepared by mixing an oxide-type lithium ion conductor with a sulfide-type lithium ion conductor (see, for example, US Patent Application Laid-Open No. 2015/0171463).

Problem to be Solved by the Invention

In the aforementioned ion conductor prepared by mixing an oxide-type lithium ion conductor with a sulfide-type lithium ion conductor, the relative amount of the sulfide-type lithium ion conductor is reduced. However, the presence of the sulfide-type lithium ion conductor results in a level of safety which leaves room for improvement.

Notably, such a problem is not limited to an ion conductor used for producing solid electrolyte layers and electrodes of complete-solid lithium ion secondary batteries, but is common with any ion conductors having lithium ion conductivity.

The present specification discloses a technique capable of solving the aforementioned problem.

SUMMARY OF THE INVENTION

Means for Solving the Problem

The technique disclosed in the present specification can be implemented in, for example, the following modes.

(1) The present specification discloses an ion conductor comprising an oxide-type lithium ion conductor that further contains a complex hydride. The lithium ion conductivity of the oxide-type lithium ion conductor can be enhanced by subjecting the powder thereof to sintering or vapor deposition. However, since the oxide-type lithium ion conductor in powder form is relatively hard, the molded product of the powder exhibits a low level of close contact between particles and relatively low lithium ion conductivity. In contrast, although the complex hydride in powder form exhibits relatively low lithium ion conductivity, close contact between particles in the powder can be readily enhanced by pressing, because it is relatively soft in powder form. The ion conductor contains an oxide-type lithium ion conductor and a complex hydride but contains no sulfide-type ion conductor, which may generate hazardous gas. In addition, close contact between particles in the powder can be enhanced through press molding of the powder alone, without performing firing or vapor deposition. Thus, high lithium ion conductivity can be attained.

(2) The aforementioned ion conductor may have a lithium ion conductivity of $1.0 \times 10^{-5}$ S/cm or higher as determined at 25° C. According to this ion conductor, higher lithium ion conductivity can be attained at room temperature.

(3) The aforementioned ion conductor may have an oxide-type lithium ion conductor content of 85 vol % or less. According to this ion conductor, the close contact between particles can be effectively enhanced through press molding of the powder alone, and the resultant compact exhibits remarkably high lithium ion conductivity.

(4) The aforementioned ion conductor may have an oxide-type lithium ion conductor content of 30 vol % or more. According to this ion conductor, there can be prevented deterioration in capacity of an electricity storage device fabricated from the ion conductor.

(5) In the aforementioned ion conductor, the complex hydride may include $LiBH_4$ and X (wherein X is one or more compounds selected from among LiCl, LiBr, LiI, and $LiNH_2$). According to this ion conductor, the close contact between particles can be effectively enhanced through press molding of the powder alone, and the resultant compact exhibits remarkably high lithium ion conductivity.

(6) In the aforementioned ion conductor, the complex hydride may be a compound having a closo-type structure represented by $Li_2(B_nH_n)$ (wherein n is an integer of 5 to 12). According to this ion conductor, the close contact between particles can be effectively enhanced through press molding of the powder alone, and the resultant compact exhibits remarkably high lithium ion conductivity.

The present specification also discloses an electricity storage device comprising a solid electrolyte layer, a cathode, and an anode, wherein at least one of the solid electrolyte layer, the cathode, and the anode contains the ion conductor described above. According to this electricity storage device, the lithium ion conductivity of at least one of the solid electrolyte layer, the cathode, and the anode can be sufficiently improved. Thus, the electric performance of the electricity storage device can be sufficiently improved.

The technique disclosed in the present specification can be implemented in various modes; for example, an ion conductor, an electricity storage device including an ion conductor, and a production method therefor.

BRIEF DESCRIPTION OF THE DRAWINGS

FIG. 2 is a table showing the results of a first performance evaluation.

FIG. 4 is a table showing the results of a second performance evaluation.

FIG. 6 is a table showing the results of a third performance evaluation.

DETAILED DESCRIPTION OF THE INVENTION

A. Embodiment

A-1. Structure of Complete-Solid Battery 102:
(Entire Structure)

Figure 1:
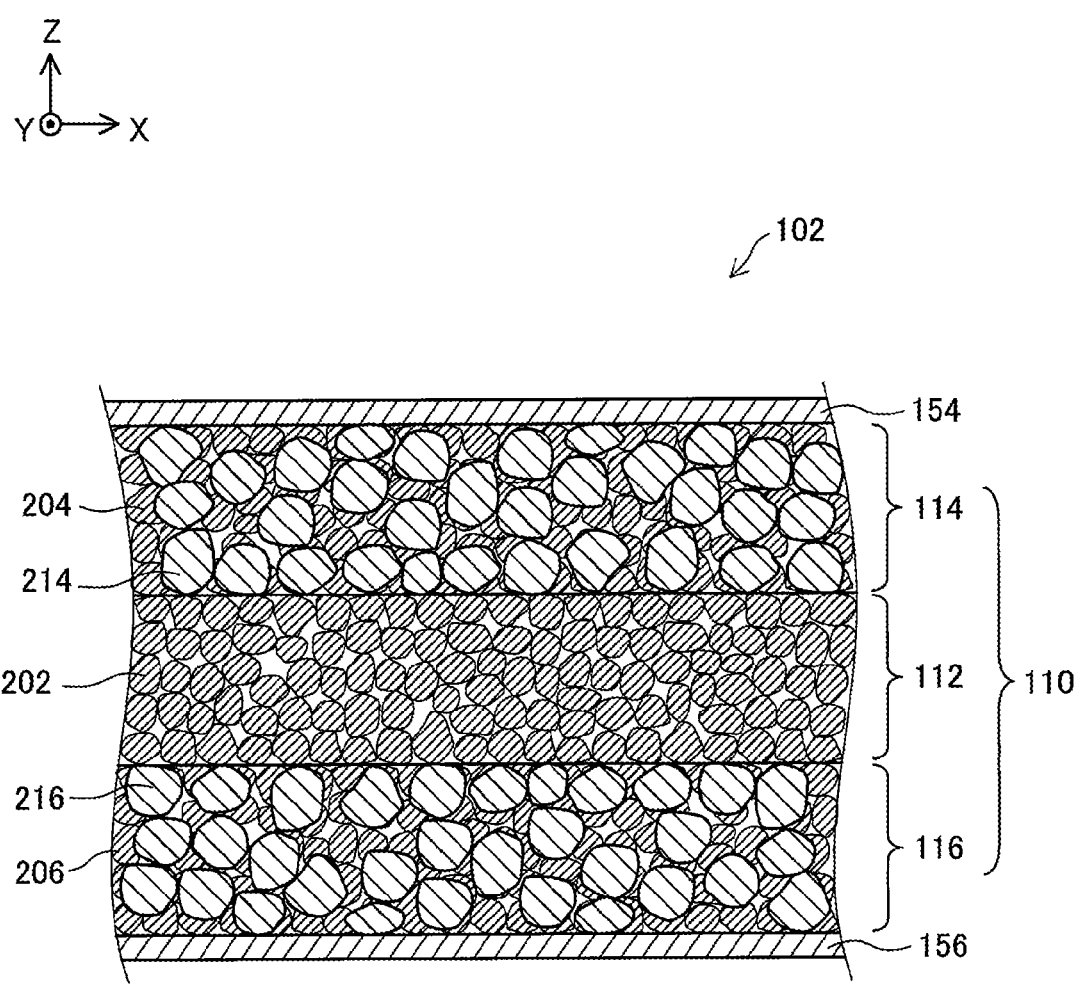
FIG. 1 is an explanatory view schematically showing a cross section of a complete-solid lithium ion secondary battery 102 according to the present embodiment.

FIG. 1 is an explanatory view schematically showing a cross section of a complete-solid lithium ion secondary battery (hereinafter will be referred to as "complete-solid battery") 102 according to the present embodiment. FIG. 1 shows mutually orthogonal X-axis, Y-axis, and Z-axis for specifying respective directions. In the present specification, for the sake of convenience, the positive Z-axis direction is called the "upward direction," and the negative Z-axis direction is called the "downward direction."

The complete-solid battery 102 includes a battery body 110, a cathode-side collector member 154 disposed on one side (upper side) of the battery body 110, and an anode-side collector member 156 disposed on the other side (lower side) of the battery body 110. Each of the cathode-side collector member 154 and the anode-side collector member 156 is an electrically conductive member having an approximately flat-plate shape, and is formed of, for example, an electrically conductive metal material selected from among stainless steel, Ni (nickel), Ti (titanium), Fe (iron), Cu (copper), Al (aluminum), and alloys of these, or a carbon material. In the following description, the cathode-side collector member 154 and the anode-side collector member 156 may be collectively referred to as "collector members."
(Structure of Battery Body 110)

The battery body 110 is a lithium ion secondary battery body in which all battery elements are formed of a solid. As used herein, the phrase "all battery elements are formed of a solid" refers to the case where the skeletons of all battery elements are formed of a solid, but does not exclude the case where, for example, any of the skeletons is impregnated with a liquid. The battery body 110 includes a cathode 114, an anode 116, and a solid electrolyte layer 112 disposed between the cathode 114 and the anode 116. In the following description, the cathode 114 and the anode 116 may collectively be referred to as "electrodes." The battery body 110 corresponds to an electricity storage device claimed in CLAIMS.
(Structure of Solid Electrolyte Layer 112)

The solid electrolyte layer 112 is a member having an approximately flat-plate shape, and contains a lithium ion conductor 202 serving as a solid electrolyte. More specifically, the solid electrolyte layer 112 is a molded product (compact) formed by press molding a powder of the lithium ion conductor 202. The structure of the lithium ion conductor 202 contained in the solid electrolyte layer 112 will be described in detail below.
(Structure of Cathode 114)

The cathode 114 is a member having an approximately flat-plate shape and contains a cathode active material 214. The cathode active material 214 is, for example, S (sulfur), $TiS_2$, $LiCoO_2$, $LiMn_2O_4$, or $LiFePO_4$. The cathode 114 contains, as a lithium-ion-conducting aid, a lithium ion conductor 204 serving as a solid electrolyte. The cathode 114 may further contain an electron-conducting aid (e.g., electrically conductive carbon, Ni (nickel), Pt (platinum), or Ag (silver)).
(Structure of Anode 116)

The anode 116 is a member having an approximately flat-plate shape and contains an anode active material 216. The anode active material 216 is, for example, Li metal, Li—Al alloy, $Li_4Ti_5O_{12}$, carbon, Si (silicon), or SiO. The anode 116 contains, as a lithium-ion-conducting aid, a lithium ion conductor 206 serving as a solid electrolyte. The cathode 116 may further contain an electron-conducting aid (e.g., electrically conductive carbon, Ni, Pt, or Ag).
A-2. Structure of Lithium Ion Conductor:

Next will be described the structure of the ion conductor 202 contained in the solid electrolyte layer 112. The lithium ion conductor 204 contained in the cathode 114 and the lithium ion conductor 206 contained in the anode 116 have the same structure as that of the ion conductor 202 contained in the solid electrolyte layer 112. Thus, description of the lithium ion conductors 204 and 206 is omitted.

In the present embodiment, the lithium ion conductor 202 of the solid electrolyte layer 112 includes an oxide-type lithium ion conductor and a complex hydride. The lithium ion conductivity of the oxide-type lithium ion conductor can be enhanced to a relatively high level by subjecting the powder thereof to sintering or vapor deposition. However, the oxide-type lithium ion conductor in powder form is relatively hard. Thus, the molded product prepared through press molding of the powder exhibits a low level of contact between particles and has low lithium ion conductivity. In contrast, although the lithium ion conductivity of the complex hydride is relatively low, close contact between particles forming the powder can be readily enhanced though pressing of the powder, because the powder is relatively soft. The lithium ion conductor 202 of the present embodiment contains an oxide-type lithium ion conductor and a complex hydride but no sulfide-type ion conductor, which may generate hazardous gas. In addition, close contact between particles can be enhanced through press molding the powder alone, without performing firing or vapor deposition, to thereby attain high lithium ion conductivity.

The oxide-type lithium ion conductor included in the lithium ion conductor 202 may be selected from various ion conductors. For example, the oxide-type lithium ion conductor included in the lithium ion conductor 202 may be at least one species of an ion conductor having a garnet-type or garnet-like structure, an ion conductor having a NASICON-type structure, and an ion conductor having a perovskite-type structure. In one particularly preferred mode, the lithium ion conductor 202 contains an oxide-type lithium ion conductor which has a garnet-type or a garnet-like structure and which contains Li, La, Zr, and at least one of Mg and A (wherein A represents at least one element selected from the group consisting of Ca, Sr, and Ba) (hereinafter referred to as "LLZ oxide-type lithium ion conductor"), and a complex hydride. Since the LLZ oxide-type lithium ion conductor is harder than other oxide-type lithium ion conductors, difficulty is encountered in attaining enhanced close contact between particles through only press molding the powder. Thus, by adding a relatively soft material such as a complex hydride to the LLZ oxide-type lithium ion conductor, close contact between particles can be enhanced through press molding the powder alone, to thereby attain high lithium ion conductivity. In other words, a mixture of the LLZ oxide-type lithium ion conductor with a complex hydride can provide a remarkable effect of enhancing the lithium ion conductivity, as compared with other oxide-type lithium ion conductors.

As the ion conductor having a garnet-type or garnet-like structure, an ion conductor at least containing Li, Zr, La, and O may be used. More specifically, the ion conductor may be, for example, $Li_7La_3Zr_2O_{12}$ (hereinafter will be referred to as "LLZ") and a product prepared by substitution of LLZ with elemental Mg (magnesium) and Sr (strontium) (hereinafter the product will be referred to as "LLZ-MgSr").

As the ion conductor having a NASICON-type structure, an ion conductor containing at least Li, M (wherein M is at least one of Ti, Zr, and Ge), P, and O may be used. More specifically, the ion conductor may be, for example, $Li_{1.5}Cl_{0.5}Ge_{1.5}(PO_4)_3$ (hereinafter referred to as "LAGP").

As the ion conductor having a perovskite-type structure, an ion conductor containing at least Li, Ti, La, and O may be used. More specifically, the ion conductor may be, for example, $La_{2/3-x}Li_{3x}TiO_3$ (hereinafter referred to as "LLT").

As the complex hydride included in the lithium ion conductor 202, various hydrides may be used. For example, the complex hydride included in the lithium ion conductor 202 may contain $LiBH_4$ and X (wherein X is at least one compound selected from among LiCl, LiBr, LiI, and $LiNH_2$). Examples of the complex hydride including $LiBH_4$ and X include $3LiBH_4 \cdot LiI$, $LiBH_4 \cdot LiNH_2$ ($=Li_2(BH_4)(NH_2)$), and $LiBH_4 \cdot 3LiNH_2$ ($=Li_4(BH_4)(NH_2)_3$).

Alternatively, the complex hydride included in the lithium ion conductor 202 may be a compound having a closo structure and represented by a formula $Li_2(B_nH_n)$ (wherein n is an integer of 5 to 12). Notably, formation of a hydrate in air from a complex hydride having a closo structure is a rate-determining step, thereby avoiding a risk for ignition. Thus, the compound is preferred. More preferably, the complex hydride included in the lithium ion conductor 202 is a compound having a closo structure and is represented by formula $Li_2(B_nH_n)$ (wherein n is an integer of 6 to 12).

Alternatively, the complex hydride included in the lithium ion conductor 202 may be a compound having a nido structure and represented by formula $Li(B_nH_{n+3})$ (wherein n is an integer of 5 to 11).

The complex hydride included in the lithium ion conductor 202 may be selected from other complex hydrides such as $LiBH_4$, $LiNH_2$, $LiBH_4 \cdot 3KI$, $LiBH_4 \cdot PI_2$, $LiBH_4 \cdot P_2S_5$, $Li_2AlH_6$, $Li(NH_2)_2I$, $Li_2NH$, and $LiGd(BH_4)_3Cl$. Alternatively, the lithium ion conductor 202 may include a plurality species of the aforementioned complex hydrides.

The amount of the oxide-type lithium ion conductor in the lithium ion conductor 202 is preferably 85 vol % or less. Under the above condition, close contact between particles can be effectively enhanced through press molding the powder of the lithium ion conductor 202 alone, whereby remarkably high lithium ion conductivity can be attained. In the case where the lithium ion conductor 202 contains LLZ-MgSr serving as the oxide-type lithium ion conductor and $3LiBH_4 \cdot LiI$ serving as the complex hydride, when the oxide-type lithium ion conductor content is 85 vol % or less, the lithium ion conductivity is $1.2 \times 10^{-5}$ S/cm or higher as determined at 25° C. In the case where the lithium ion conductor 202 contains LLZ-MgSr serving as the oxide-type lithium ion conductor and $Li_2(B_{12}H_{12})$ serving as the complex hydride, when the oxide-type lithium ion conductor content is 85 vol % or less, the lithium ion conductivity is $1.7 \times 10^{-5}$ S/cm or higher as determined at 25° C.

The oxide-type lithium ion conductor content of the lithium ion conductor 202 is more preferably 20 vol % to 85 vol %, further preferably 30 vol % to 75 vol %.

Also, the oxide-type lithium ion conductor content of the lithium ion conductor 202 is preferably 30 vol % to 85 vol %. Under the above condition, deterioration of the capacity of the complete-solid battery 102 fabricated from the lithium ion conductor 202 can be prevented. In order to more effectively prevent deterioration of the capacity of the complete-solid battery 102, the oxide-type lithium ion conductor content of the lithium ion conductor 202 is more preferably 40 vol % to 75 vol %.

The presence of an oxide-type lithium ion conductor (e.g., LLZ-MgSr) or a complex hydride (e.g., the aforementioned $3LiBH_4 \cdot LiI$, a complex hydride having a closo structure, or a complex hydride having a nido structure) in the lithium ion conductor 202 can be detected through X-ray diffraction analysis (XRD) of the lithium ion conductor 202.

The ratio by volume (vol %) of oxide-type lithium ion conductor to complex hydride in the lithium ion conductor 202 can be determined through the following procedure. Specifically, an analysis target (e.g., the solid electrolyte layer 112 formed of the lithium ion conductor 202) is cut to develop a cut surface, which is then polished. Visual fields (×5,000) of the polished surface are selected at random, and the polished surface is analyzed by means of an energy-dispersive X-ray spectrometer (EDS) of a scanning electron microscope (SEM). Through determination of the element profile of the oxide-type lithium ion conductor (La and Zr in the case of LLZ-MgSr above) and the complex hydride (elements included in X in the case of the aforementioned complex hydride including $LiBH_4$ and X) or through analysis of the contrast in a reflected electron image, the ratio of the area attributed to the oxide-type lithium ion conductor to the area attributed to the complex hydride is determined. The ratio is reduced to the ratio by volume (vol %) of the oxide-type lithium ion conductor to the complex hydride.

A-3. Production Method for Complete-Solid Battery 102:

Next will be described an exemplary production method for the complete-solid battery 102 of the present embodiment. Firstly, the solid electrolyte layer 112 is formed. Specifically, an oxide-type lithium ion conductor powder and a complex hydride powder are provided, and two powders are mixed at a specific ratio, to thereby prepare a powder mixture. The thus-prepared powder mixture is press-molded at a predetermined pressure, to thereby yield the solid electrolyte layer 112 formed of the lithium ion conductor 202 containing the oxide-type lithium ion conductor and the complex hydride.

Subsequently, the cathode 114 and the anode 116 are formed. Specifically, a powder of the cathode active material 214, the aforementioned powder mixture, and an optional electron-conducting aid powder are mixed in predetermined proportions, and the resultant powder mixture is pulverized and then subjected to molding, to thereby form the cathode 114. Separately, a powder of the anode active material 216, the aforementioned powder mixture, and an optional electron-conducting aid powder are mixed, and the resultant powder mixture is pulverized and then subjected to molding, to thereby form the anode 116.

Thereafter, the cathode-side collector member 154, the cathode 114, the solid electrolyte layer 112, the anode 116, and the anode-side collector member 156 are stacked in this order, and then integrated together by pressing. Through the above-described process, the complete-solid battery 102 having the aforementioned structure is produced.

Figure 3:
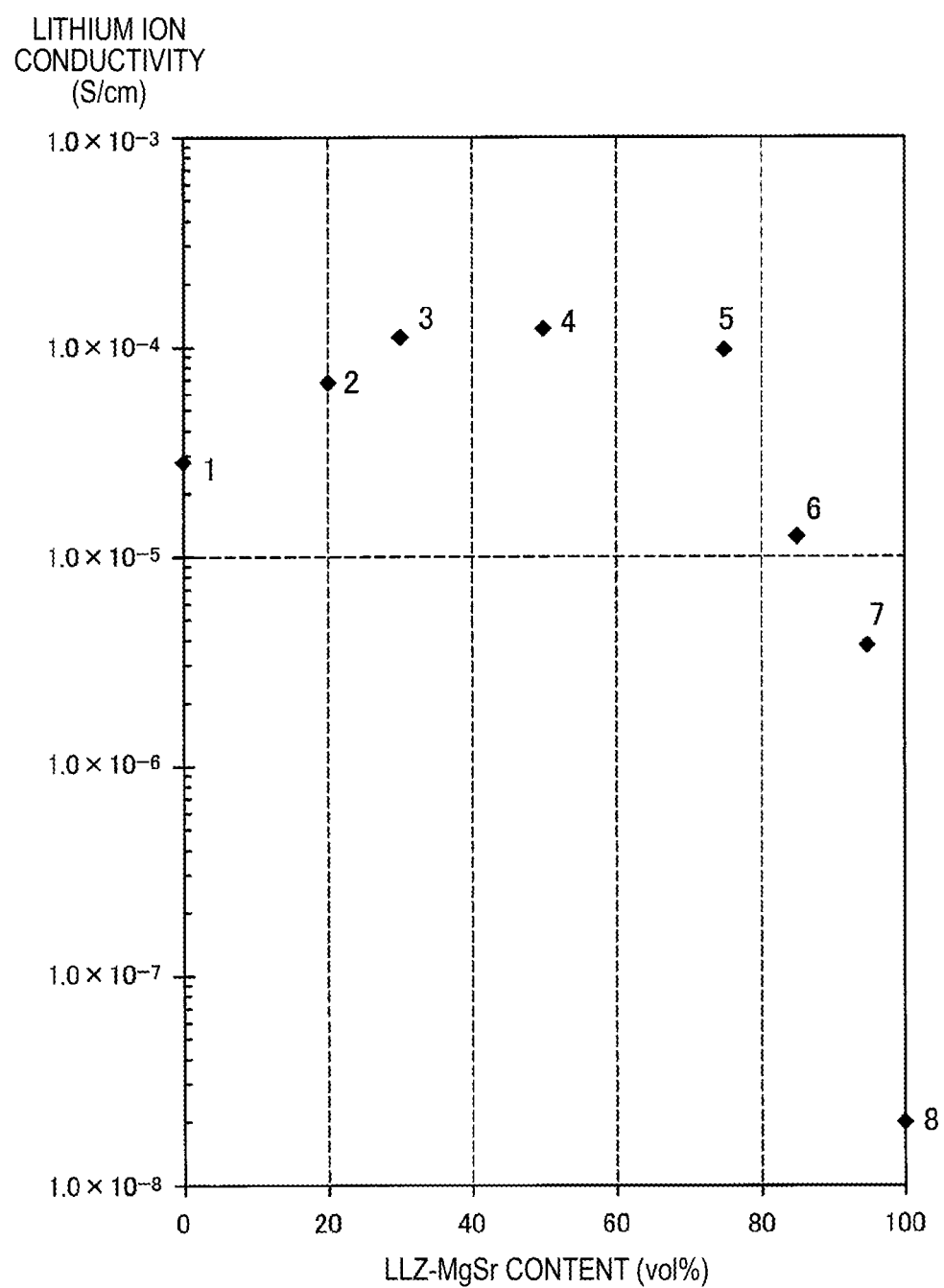
FIG. 3 is a graph showing the results of the first performance evaluation.
Figure 5:
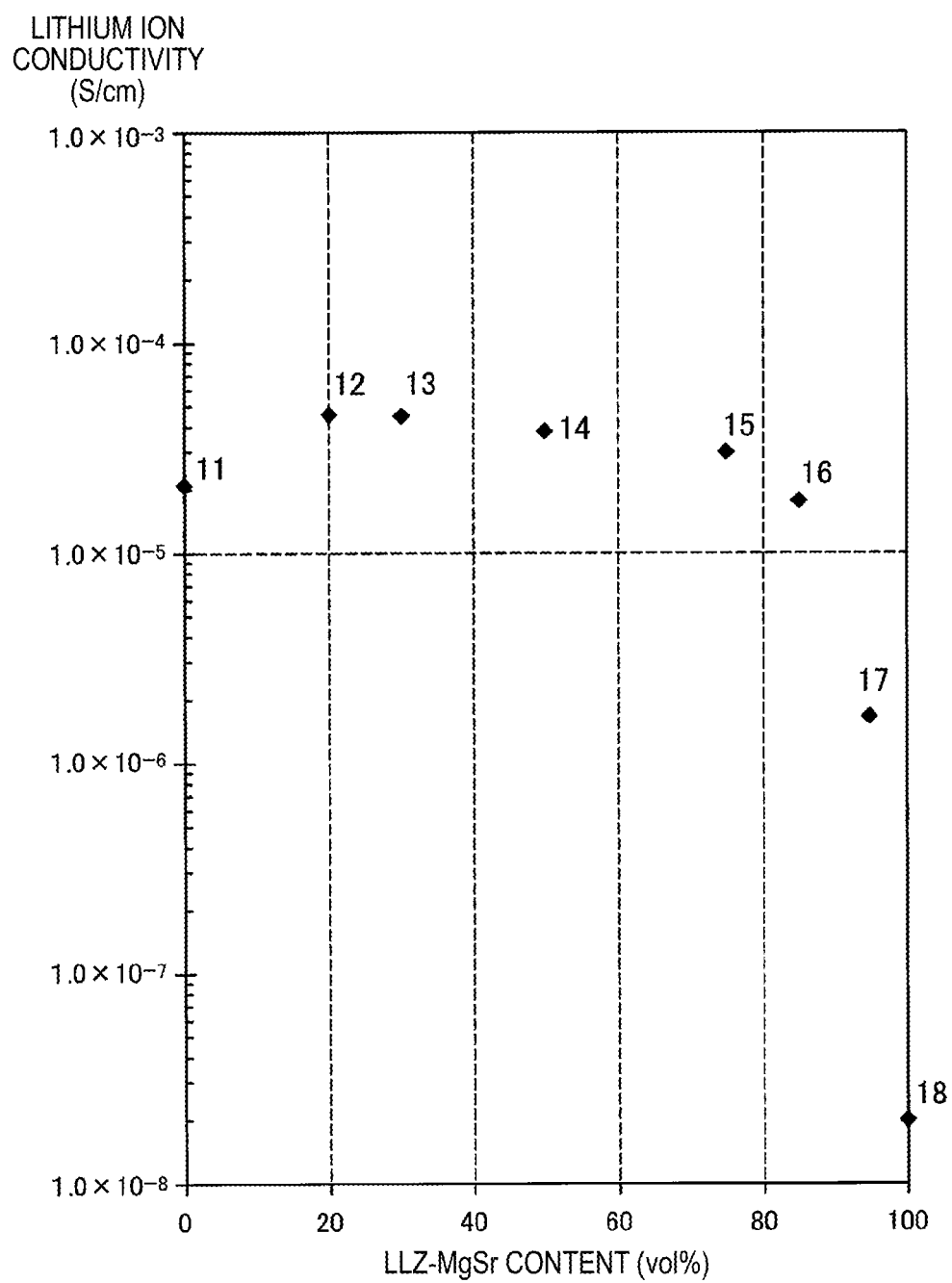
FIG. 5 is a graph showing the results of the second performance evaluation.

A-4. Performance Evaluation:

Lithium ion conductors 202, 204, and 206 contained in the respective layers (solid electrolyte layer 112, cathode 114, and anode 116) of a complete-solid battery 102 were evaluated for lithium ion conductivity. FIGS. 2 and 3 are a table and a graph showing the results of performance evaluation of lithium ion conductors each containing LLZ-MgSr (oxide-type lithium ion conductor) and $3LiBH_4 \cdot LiI$ (complex hydride) (hereinafter referred to as "first performance evaluation"). FIGS. 4 and 5 are a table and a graph showing the results of performance evaluation of lithium ion conductors each containing LLZ-MgSr (oxide-type lithium ion conductor) and $Li_2B_{12}H_{12}$ (complex hydride) (hereinafter referred to as "second performance evaluation").

As shown in FIGS. 2 and 3, eight samples (S1 to S8) were employed in the first performance evaluation. The samples differ from one another in terms of composition of the lithium ion conductor; more specifically, the content ratio (vol %) of oxide-type lithium ion conductor (LLZ-MgSr) to complex hydride ($3LiBH_4 \cdot LiI$). Notably, lithium ion conductor sample S1 contains $3LiBH_4 \cdot LiI$ as a sole complex hydride and no oxide-type lithium ion conductor, and lithium ion conductor sample S8 contains LLZ-MgSr as a sole oxide-type lithium ion conductor and no complex hydride. The numerals corresponding to the plotted points in FIG. 3 respectively denote sample numbers shown in FIG. 2.

As shown in FIGS. 4 and 5, eight samples (S11 to S18) were employed in the second performance evaluation. The samples differ from one another in terms of composition of the lithium ion conductor; more specifically, the content ratio (vol %) of oxide-type lithium ion conductor (LLZ-MgSr) to complex hydride ($Li_2B_{12}H_{12}$). Notably, lithium ion conductor sample S11 contains $Li_2B_{12}H_{12}$ as a sole complex hydride and no oxide-type lithium ion conductor, and lithium ion conductor sample S18 contains LLZ-MgSr as a sole oxide-type lithium ion conductor and no complex hydride (i.e., the same sample as sample S8 of FIG. 2). The numerals corresponding to the plotted points in FIG. 5 respectively denote sample numbers shown in FIG. 4.

Methods for preparation and evaluation of the samples in the first and second performance evaluations will be described below.

(First Performance Evaluation)

$Li_2CO_3$, MgO, $La(OH)_3$, $SrCO_3$, and $ZrO_2$ were weighed so as to achieve a composition of $Li_{6.95}Mg_{0.15}La_{2.75}Sr_{0.25}Zr_{2.0}O_{12}$ (LLZ-MgSr). In consideration of volatilization of Li during firing, $Li_2CO_3$ was further added so that the amount of elemental Li was in excess, by about 15 mol %. These raw materials were added to a nylon pot together with zirconia balls, and the resultant mixture was pulverized by means of a ball mill in an organic solvent for 15 hours. Thereafter, the resultant slurry was dried and then calcined on an MgO plate at 1,100° C. for 10 hours. A binder was added to the calcined powder, and the mixture was subjected to pulverization by means of a ball mill in an organic solvent for 15 hours. Thereafter, the resultant slurry was dried, and the dried material was added to a mold having a diameter of 12 mm. The material was press-molded so as to have a thickness of about 1.5 mm, and then the molded product was pressed at an isostatic pressure of 1.5 t/cm² by means of a cold isostatic pressing (CIP) machine, to thereby form a compact. The compact was covered with a calcination powder having the same composition as that of the compact and fired in a reducing atmosphere at 1,100° C. for four hours, to thereby yield a sintered body. The sintered body was found to have a lithium ion conductivity of $1.0 \times 10^{-3}$ S/cm. The sintered body was pulverized in a glove box with an argon atmosphere, to thereby prepare a powder of LLZ-MgSr.

Under argon, the LLZ-MgSr powder prepared through the aforementioned method and a separately provided complex hydride ($3LiBH_4 \cdot LiI$) powder were mixed at a volume ratio predetermined for the corresponding sample (total: 2 g), and the mixture was pulverized by means of a planetary ball mill including a zirconia pot (45 cc) and balls having a diameter of 4 mm (96.5 g) at 200 rpm for 3 hours, to thereby prepare an $LLZ-MgSr/3LiBH_4 \cdot LiI$ powder mixture. Notably, as described above, sample S1 contained $3LiBH_4 \cdot LiI$ powder instead of the powder mixture, and sample S8 contained LLZ-MgSr powder instead of the powder mixture.

Under argon, each of the powder mixture was prepared through the aforementioned method (however, $3LiBH_4 \cdot LiI$ single powder was employed in sample S1, and LLZ-MgSr single powder was employed in sample S8; the same conditions will apply throughout the experiments). The powder mixture was added to a mold having a diameter of 10 mm, and press-molded at a pressure of 500 MPa, to thereby form a molded product (compact) of a lithium ion conductor. The compact was fixed with a force corresponding to 50 MPa by means of a pressing jig, and the lithium ion conductivity of the compact was determined at room temperature.

(Second Performance Evaluation)

A complex hydride $Li_2B_{12}H_{12} \cdot 4H_2O$ was heat-dried at 250° C. for 20 hours under vacuum, whereby crystal water was removed. Subsequently, under argon, an aliquot (0.5 g) of the dried powder was taken and pulverized by means of a planetary ball mill including a zirconia pot (45 cc) and zirconia balls at 400 rpm for 5 hours. After pulverization, the powder was dried in vacuum at 160° C. for 12 hours, to thereby yield $Li_2B_{12}H_{12}$ powder.

Under argon, the LLZ-MgSr powder prepared in the same manner as employed in the first performance evaluation and the separately provided $Li_2B_{12}H_{12}$ powder were mixed at a volume ratio predetermined for the corresponding sample (total: 2 g). The mixture was pulverized by means of a planetary ball mill including a zirconia pot (45 cc) and balls having a diameter of 4 mm (96.5 g) at 200 rpm for 3 hours, to thereby prepare an LLZ-MgSr/Li$_2$B$_{12}$H$_{12}$ powder mixture. Notably, as described above, sample S11 contained Li$_2$B$_{12}$H$_{12}$ powder instead of the powder mixture, and sample S18 contained LLZ-MgSr powder instead of the powder mixture.

Under argon, each of the powder mixture was prepared through the aforementioned method (however, Li$_2$B$_{12}$H$_{12}$ single powder was employed in sample S11, and LLZ-MgSr single powder was employed in sample S18; the same conditions will apply throughout the experiments). The powder mixture was added to a mold having a diameter of 10 mm, and press-molded at a pressure of 360 MPa, to thereby form a molded product (compact) of a lithium ion conductor. The compact was fixed with a force corresponding to 50 MPa by means of a pressing jig, and the lithium ion conductivity of the compact was determined at room temperature.

(Results of First Performance Evaluation)

As shown in FIGS. 2 and 3, the lithium ion conductivity of the oxide-type lithium ion conductor formed from solely LLZ-MgSr (sample S8) was a low value of $2.0 \times 10^{-8}$ S/cm. In contrast, samples S2 to S7, each containing an oxide-type lithium ion conductor LLZ-MgSr and a complex hydride 3LiBH$_4$·LiI, exhibited a lithium ion conductivity of $3.6 \times 10^{-6}$ S/cm or higher, which was higher than the lithium ion conductivity of sample S8 formed from solely LLZ-MgSr. Thus, the results have proven that, in a lithium ion conductor containing the oxide-type lithium ion conductor LLZ-MgSr and the complex hydride 3LiBH$_4$·LiI, close contact between particles can be enhanced through press molding of the powder alone, without performing firing or vapor deposition, to thereby attain high lithium ion conductivity.

Among samples S2 to S7, samples S2 to S6, having an oxide-type lithium ion conductor LLZ-MgSr content of 85 vol % or less, each exhibited a lithium ion conductivity of a higher value of $1.0 \times 10^{-5}$ S/cm or higher. Thus, the results have proven that when the lithium ion conductor containing the oxide-type lithium ion conductor LLZ-MgSr and the complex hydride 3LiBH$_4$·LiI has an LLZ-MgSr content of 85 vol % or less, higher lithium ion conductivity can be attained. Among samples S2 to S6, samples S3 to S5, having an oxide-type lithium ion conductor LLZ-MgSr content of 30 vol % to 75 vol %, each exhibited a lithium ion conductivity of a remarkably high value of $1.0 \times 10^{-4}$ S/cm or higher. Thus, the results have proven that when the lithium ion conductor containing the oxide-type lithium ion conductor LLZ-MgSr and the complex hydride 3LiBH$_4$·LiI has an LLZ-MgSr content of 30 vol % to 75 vol %, remarkably high lithium ion conductivity can be attained.

(Results of Second Performance Evaluation)

As shown in FIGS. 4 and 5, the lithium ion conductivity of the oxide-type lithium ion conductor formed from solely LLZ-MgSr (sample S18) was a low value of $2.0 \times 10^{-8}$ S/cm. In contrast, samples S12 to S17, each containing an oxide-type lithium ion conductor LLZ-MgSr and a complex hydride Li$_2$B$_{12}$H$_{12}$, exhibited a lithium ion conductivity of $1.6 \times 10^{-6}$ S/cm or higher, which was higher than the lithium ion conductivity of sample S18 formed from solely LLZ-MgSr. Thus, the results have proven that, in a lithium ion conductor containing the oxide-type lithium ion conductor LLZ-MgSr and the complex hydride Li$_2$B$_{12}$H$_{12}$, close contact between particles can be enhanced through press molding of the powder alone, without performing firing or vapor deposition, to thereby attain high lithium ion conductivity.

Among samples S12 to S17, samples S12 to S16, having an oxide-type lithium ion conductor LLZ-MgSr content of 85 vol % or less, each exhibited a lithium ion conductivity of a higher value of $1.0 \times 10^{-5}$ S/cm or higher. Thus, the results have proven that when the lithium ion conductor containing the oxide-type lithium ion conductor LLZ-MgSr and the complex hydride Li$_2$B$_{12}$H$_{12}$ has an LLZ-MgSr content of 85 vol % or less, higher lithium ion conductivity can be attained. Among samples S12 to S16, samples S13 to S15, having an oxide-type lithium ion conductor LLZ-MgSr content of 30 vol % to 75 vol %, each exhibited a lithium ion conductivity of a remarkably high value of $3.0 \times 10^{-5}$ S/cm or higher. Thus, the results have proven that when the lithium ion conductor containing the oxide-type lithium ion conductor LLZ-MgSr and the complex hydride Li$_2$B$_{12}$H$_{12}$ has an LLZ-MgSr content of 30 vol % to 75 vol %, remarkably high lithium ion conductivity can be attained.

Separately, the performance of the lithium ion conductor included in the complete-solid battery 102 was evaluated in terms of capacity maintenance ratio (hereinafter referred to as "third performance evaluation"). FIG. 6 is a table showing the results of the third performance evaluation of lithium ion conductors each containing LLZ-MgSr (oxide-type lithium ion conductor) and Li$_2$B$_{12}$H$_{12}$ (complex hydride).

As shown in FIG. 6, nine battery samples (S21 to S29) were employed in the third performance evaluation. The samples differ from one another in terms of composition of the lithium ion conductor; more specifically, the content ratio (vol %) of oxide-type lithium ion conductor (LLZ-MgSr) to complex hydride (Li$_2$B$_{12}$H$_{12}$). Notably, lithium ion conductor sample S21 contains Li$_2$B$_{12}$H$_{12}$ as a sole complex hydride and no oxide-type lithium ion conductor.

Methods for preparation and evaluation of the samples in the third performance evaluation will be described below. Specifically, in the same manner as employed in the second performance evaluation, an LLZ-MgSr/Li$_2$B$_{12}$H$_{12}$ powder mixture was obtained by mixing the two components at a volume ratio predetermined for the corresponding sample. Notably, as described above, sample S21 contained Li$_2$B$_{12}$H$_{12}$ powder instead of the powder mixture. In the same manner as employed in the second performance evaluation, the powder mixture (however, Li$_2$B$_{12}$H$_{12}$ single powder was employed in sample S21, and the same condition will apply throughout the experiments) was press-molded to form a solid electrolyte layer. On one surface of the solid electrolyte layer, a cathode active substance (LiNi$_{0.8}$Co$_{0.15}$Al$_{0.05}$O$_2$) and the aforementioned LLZ-MgSr/Li$_2$B$_{12}$H$_{12}$ powder at a volume ratio predetermined for the corresponding sample were deposited, and the deposit was pressed again to the layer. On the other surface of the solid electrolyte layer, In—Li foil was attached, to thereby fabricate a battery.

The thus-fabricated battery was subjected to a charge-discharge test under pressurized conditions. The charge-discharge was performed at a current density of 64 μA/cm$^2$, and cut-off voltages of 3.6 V (upon charging) and 2.4 V (upon discharging). The capacity maintenance ratio (i.e., voltage after 10 charge-discharge cycles/initial voltage) of each battery sample after 10 charge-discharge cycles was determined.

As shown in FIG. 6, samples S21 to S23, having an oxide-type lithium ion conductor LLZ-MgSr content of 25 vol % or less, each exhibited a capacity maintenance ratio lower than 70%. A conceivable reason for such a low capacity maintenance ratio is as follows. These samples have a high complex hydride Li$_2$B$_{12}$H$_{12}$ content, and the complex hydride Li$_2$B$_{12}$H$_{12}$ reacts with the cathode active substance during the course of charge-discharge cycles, to thereby generate a high-resistance substance, which causes severe deterioration in battery capacity.

In contrast, samples S24 to S28, having an oxide-type lithium ion conductor LLZ-MgSr content of 30 vol % to 85 vol %, each exhibited a high capacity maintenance ratio of 80% or higher. A conceivable reason for such a high capacity maintenance ratio is as follows. These samples have a low complex hydride $Li_2B_{12}H_{12}$ content, to thereby prevent generation of the aforementioned high-resistance substance, which would otherwise cause deterioration in battery capacity. Thus, the results have proven that when the lithium ion conductor containing the oxide-type lithium ion conductor LLZ-MgSr and the complex hydride $Li_2B_{12}H_{12}$ has an LLZ-MgSr content of 30 vol % to 85 vol %, deterioration of battery capacity can be prevented. Notably, among samples S24 to S28, samples S25 to S27, having an oxide-type lithium ion conductor LLZ-MgSr content of 40 vol % to 75 vol %, each exhibited a remarkably high capacity maintenance ratio of 85% or higher. Thus, the results have proven that when the lithium ion conductor containing the oxide-type lithium ion conductor LLZ-MgSr and the complex hydride $Li_2B_{12}H_{12}$ has an LLZ-MgSr content of 40 vol % to 75 vol %, deterioration of battery capacity can be effectively prevented.

B. Modifications

The technique disclosed in the present specification is not limited to the aforementioned embodiment, but may be modified into various other forms without departing from the gist thereof. For example, the technique may be modified as described below.

In the aforementioned embodiment, the configuration of the complete-solid battery 102 is a mere example, and may be modified into various forms. For example, in the aforementioned embodiment, the lithium ion conductor containing both the oxide-type lithium ion conductor and the complex hydride is contained in all of the solid electrolyte layer 112, the cathode 114, and the anode 116. However, the lithium ion conductor may be contained in at least one of the solid electrolyte layer 112, the cathode 114, and the anode 116.

The technique disclosed in the present specification is not limited to the solid electrolyte layer or electrode forming the complete-solid battery 102, but can also be applied to a solid electrolyte layer or electrode forming another electricity storage device (e.g., a lithium-air battery, a lithium flow battery, or a solid capacitor).

DESCRIPTION OF REFERENCE NUMERALS

102: complete-solid lithium ion secondary battery; 110: battery body; 112: solid electrolyte layer; 114: cathode; 116: anode; 154: cathode-side collector member; 156: anode-side collector member; 202: lithium ion conductor; 204: lithium ion conductor; 206: lithium ion conductor; 214: cathode active material; and 216: anode active material

The invention claimed is:

1. An ion conductor consisting of:
   an oxide-type lithium ion conductor; and
   a complex hydride.

2. The ion conductor according to claim 1,
   wherein a lithium ion conductivity of the ion conductor is $1.0 \times 10^{-5}$ S/cm or higher as determined at 25° C.

3. The ion conductor according to claim 1,
   wherein a content of the oxide-type lithium ion conductor is 85 vol % or less.

4. The ion conductor according to claim 3,
   wherein a content of the oxide-type lithium ion conductor is 20 vol % or more.

5. The ion conductor according to claim 4,
   wherein a content of the oxide-type lithium ion conductor is 30 vol % or more.

6. The ion conductor according to claim 1, wherein the complex hydride includes $LiBH_4$ and X (where X is one or more compounds selected from among LiCl, LiBr, LiI, and $LiNH_2$.

7. The ion conductor according to claim 1, wherein the complex hydride is a compound having a closo-type structure represented by $Li_2(B_nH_n)$ (where n is an integer of 5 to 12.

8. An electricity storage device comprising a solid electrolyte layer, a cathode and an anode, wherein at least one of the solid electrolyte layer, the cathode and the anode contains an ion conductor as recited in claim 1.

9. An ion conductor according to claim 1,
   wherein a ratio by volume (vol %) of the oxide-type lithium ion conductor to the complex hydride is between 20:80 and 85:15.

10. The ion conductor according to claim 1, wherein the oxide-type lithium ion conductor contains Li, La, Zr, and at least one of Mg and A, where A is at least one element selected from the group consisting of Ca, Sr, and Ba.

11. The ion conductor according to claim 1, wherein the oxide-type lithium ion conductor consists of Li, La, Zr, O, Mg and Sr.

12. The ion conductor according to claim 1, wherein the oxide-type lithium ion conductor contains Li, P, O and M, where M at least one element selected from the group consisting of Ti, Zr, and Ge.

13. The ion conductor according to claim 1, wherein a content of the oxide-type lithium ion conductor is in a range of 20 vol % or more and 85 vol % or less.

* * * * *